United States Patent
Mashkin et al.

(10) Patent No.: US 10,910,897 B2
(45) Date of Patent: Feb. 2, 2021

(54) WATER-COOLED GENERATOR STRIP HAVING A COOLING CHANNEL GAP SPACE

(71) Applicant: Siemens Aktiengesellschaft, Munich (DE)

(72) Inventors: Andrey Mashkin, Cologne (DE); Mario Brockschmidt, Essen (DE); Ralf Merte, Dortmund (DE); Friedhelm Pohlmann, Essen (DE); Christoph Lehmann, Neukirchen-Vluyn (DE); Bobby A. Warren, Fort Mill, SC (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/314,073

(22) PCT Filed: May 31, 2017

(86) PCT No.: PCT/EP2017/063155
§ 371 (c)(1),
(2) Date: Dec. 28, 2018

(87) PCT Pub. No.: WO2018/007071
PCT Pub. Date: Jan. 11, 2018

(65) Prior Publication Data
US 2019/0245399 A1    Aug. 8, 2019

(30) Foreign Application Priority Data
Jul. 4, 2016   (EP) ..................... 16177683

(51) Int. Cl.
*H02K 3/24*    (2006.01)
*H02K 3/30*    (2006.01)
(Continued)

(52) U.S. Cl.
CPC ............... *H02K 3/24* (2013.01); *H02K 3/12* (2013.01); *H02K 3/30* (2013.01); *H02K 3/345* (2013.01);
(Continued)

(58) Field of Classification Search
CPC  H02K 3/24; H02K 9/19; H02K 9/193; H02K 9/197; H02K 3/12; H02K 3/30;
(Continued)

(56) References Cited

U.S. PATENT DOCUMENTS 2,920,218 A    1/1960   Beckwith
3,960,803 A    6/1976   Smith et al.
(Continued)

FOREIGN PATENT DOCUMENTS

CN    201656723 U    11/2010
DE    973696 C    5/1960
(Continued)

*Primary Examiner* — Michael Andrews

(57) ABSTRACT

A water-cooled generator strip having at least two conductor stacks which are arranged parallel and in each case have a plurality of conductors arranged one above the other and electrically insulated from one another by a conductor insulation, wherein the conductors are secured geometrically relative to one another by a cured resin, and wherein between the conductor stacks a gap space is provided, in which at least one cooling channel is arranged for conveying cooling water.

15 Claims, 3 Drawing Sheets

(51) Int. Cl.
- *H02K 9/19* (2006.01)
- *H02K 3/12* (2006.01)
- *H02K 3/34* (2006.01)
- *H02K 7/18* (2006.01)
- *H02K 15/12* (2006.01)

(52) U.S. Cl.
CPC ............ *H02K 7/1823* (2013.01); *H02K 9/19* (2013.01); *H02K 15/12* (2013.01)

(58) Field of Classification Search
CPC ...... H02K 3/345; H02K 7/1823; H02K 15/12; H02K 15/067
USPC ............................... 310/54, 52, 58, 59, 60 A
See application file for complete search history.

(56) References Cited

U.S. PATENT DOCUMENTS

| | | | |
|---|---|---|---|
| 5,408,152 | A | 4/1995 | Finnerty et al. |
| 6,624,547 | B1 | 9/2003 | Emery |
| 2005/0012409 | A1* | 1/2005 | Philippart ............ B63H 21/383 310/54 |
| 2006/0018116 | A1 | 1/2006 | Plunk et al. |
| 2006/0181162 | A1 | 8/2006 | Pierret et al. |
| 2008/0284262 | A1* | 11/2008 | Nelson ..................... C08K 3/14 310/52 |

FOREIGN PATENT DOCUMENTS

| | | |
|---|---|---|
| DE | 1128542 B | 4/1962 |
| DE | 2428816 A1 | 1/1975 |
| GB | 1034847 A | 7/1966 |
| JP | S5149401 | 4/1976 |
| JP | S53038602 | 4/1978 |
| JP | S56103939 A | 8/1981 |
| JP | H0670480 U | 9/1994 |
| JP | H07274441 A | 10/1995 |
| JP | 2002165391 A | 6/2002 |
| JP | 2002191149 A | 7/2002 |
| JP | 2006504386 A | 2/2006 |
| JP | 5674900 B1 | 2/2015 |
| RU | 2025869 C1 | 12/1994 |

* cited by examiner

WATER-COOLED GENERATOR STRIP HAVING A COOLING CHANNEL GAP SPACE

CROSS REFERENCE TO RELATED APPLICATIONS

This application is the US National Stage of International Application No. PCT/EP2017/063155 filed May 31, 2017, and claims the benefit thereof. The International Application claims the benefit of European Application No. EP16177683 filed Jul. 4, 2016. All of the applications are incorporated by reference herein in their entirety.

FIELD OF INVENTION

The invention relates to a water-cooled generator strip having at least two conductor stacks arranged in parallel, to an electric machine having a plurality of such generator strips, and to a method for producing water-cooled generator strips.

BACKGROUND OF INVENTION

An electric machine, such as for example a turbogenerator, has a winding of electrical conductors. The electrical conductors are encased on their circumference by a conductor insulation, in order to electrically insulate the electrical conductors with respect to the surroundings, with respect to a laminated core of the electric machine and/or with respect to neighboring turns of the winding.

In the case of known electric machines 100, for example as shown in FIG. 1, the laminated core in the stator 2 is in the form of a stator core 4, which has—distributed uniformly over the circumference—parallel recesses 6 (also referred to as grooves), in each of which a plurality of series-connected generator strips 110, synonymously referred to as stator strips in the stator, house the electrical conductors of the stator. A common arrangement of the conductors within the generator strips here provides two conductor stacks 12 and 14, arranged in parallel, each having a plurality of conductor bars 8 arranged one above another and individually insulated by means of a conductor insulation 16. These often have a rounded, rectangular cross section 18, for example with a side ratio of five (long side) to one (short side), and have a length which is many times the dimensions of the cross section. In a common construction, individual conductor bars 8 of the various conductor stacks are transposed between the series-connected generator strips, i.e. the conductor bars 8 are offset between the generator strips and thus change the conductor stack at the transition between two generator strips.

The conductor bars 8 are fastened in relation to one another, just like the conductor stacks 12 and 14, by means of a cured resin 22, which has been introduced between the conductor stacks by means of a separator 124 during assembly. The entire generator strip is electrically insulated with respect to the stator core 4 at least on its circumference by means of a main insulation 26.

The arrangement of such generator strips 110 in the stator core means that it is necessary to dissipate the heat introduced through the electricity induction by means of a cooling circuit. This is done conventionally by every fifth or every seventh (every fourth in FIG. 1 for easier illustration) one of the conductors 8 arranged one above another in each conductor stack 12 and 14 being replaced by a cooling channel 120 for the guidance of cooling water. Just like the conductors 8, the cooling channels in a common construction are also transposed and offset.

In a typical known generator strip 110, in which for example 30 conductor bars are arranged one above another in each case in two parallel conductor stacks 12 and 14, it is consequently the case that approximately eight to twelve cooling water channels are to be guided through the generator strip and are to be connected at end sides of the generator strip in each case to a water circuit of the electric machine 100.

SUMMARY OF INVENTION

It is an object of the invention to provide a water-cooled generator strip which is simple in terms of structure, manufacturing and assembly, in particular with respect to the integration of the cooling water circuit.

This object is achieved by a generator strip as per the independent claim.

A water-cooled generator strip according to the invention has at least two conductor stacks, which are arranged in parallel and which each have a plurality of conductors which are arranged one above another and are electrically insulated from one another by means of a conductor insulation. The generator strip is advantageously of the type of construction in which the individual insulated conductors of each conductor stack are fastened geometrically (i.e. in their position in relation to one another) in relation to one another and/or the conductor stacks themselves are fastened geometrically (i.e. in their position in relation to one another) in relation to one another by means of a cured resin, which advantageously at least partially surrounds the conductors. According to the invention, a clearance is provided between the conductor stacks, in which clearance there is arranged at least one cooling channel for conveying cooling water.

In order to improve the transfer of heat from the conductor bars of the conductor stacks to the cooling channel, the cooling channel advantageously has a water-repellent outer shell of high thermal conductivity, the outer side of which is in contact at least in partial portions with the conductors of the conductor stacks, and in particular the conductor insulation thereof. Such a contact is to be understood as meaning in particular a direct, areal contact between the outer shell of the cooling channel and the insulation of the conductor. The conductor insulation advantageously comprises a material having a good thermal conductivity.

Heat is dissipated from the generator strip in this case via the cooling channel which is guided centrally or in the middle in such a manner, the two conductor stacks being spaced apart from one another to a sufficient extent that a cooling channel with a sufficient flow rate for the required cooling performance finds space in the clearance arranged therebetween.

When connecting a generator strip, for example to a further generator strip with a staggered conductor guidance, the central guidance of the cooling channel dispenses with the need to connect the cooling channel by means of a complex offset connection, if appropriate likewise staggered. Such offset connections may be necessary, for example, for the cooling channels described above in relation to the prior art, which are used instead of a conductor, and require an expensive material, for example suitable V2A steel alloys. The central cooling channel according to the invention does not have to be offset in this manner. Other and more beneficial materials may therefore be used for its outer shell and/or if appropriate interfaces.

Moreover, a generator strip according to the invention requires a lower design height in the vertical stacking direction, because every fifth to seventh position in the conductor stack is no longer required for a cooling channel, for example, and instead can be occupied by a conductor bar. As a result, the required stator groove depth and/or the required stator core diameter can be reduced.

The invention is of course also applicable for generator strips having three or more conductor stacks arranged in parallel, in which case a separate clearance is provided in each case between the respectively neighboring conductor stacks, in which clearance there is arranged a (also referred to for the purposes of the invention as "central" or "middle") cooling channel.

The material of the outer shell of the cooling channel comprises in particular a fiber-reinforced and/or abrasion-resistant polymer material and/or a non-magnetic, metallic material. By way of example, the following materials are considered: glass-fiber-reinforced polymers, carbon-fiber-reinforced polymers, Teflon, aramid, Kevlar, Modflon, polyimides, Nomex, stainless steels such as, for example, V2A steel, and/or aluminum.

The outer shell of the cooling channel comprises an electrical insulating layer. Given a suitable geometrical configuration, this allows for a targeted, direct influencing of the magnetic fields in the electric machine, which may be desired in certain applications. To this end, if appropriate the ferromagnetic material may also be used only in certain regions and/or in different proportions by weight.

In an alternative embodiment, the outer shell of the cooling channel comprises a ferromagnetic material and an elastic insulating layer.

The cooling channel advantageously extends substantially along the entire stacking height of the conductor stacks in order to promote a homogeneous and sufficient dissipation of heat.

Above a certain stacking height of the conductor stacks, it may be expedient, to achieve a homogeneous flow of cooling water, to divide the cooling channel at least into regions, in order to promote a homogeneous dissipation of heat. To this end, at least one separating band (in the sense of a bridge from one outer wall to the other outer wall), running in particular transversely to the vertical stacking direction, is advantageously provided in the cooling channel for directing a flow of cooling water in the cooling channel.

Another possibility for promoting a homogeneous dissipation of heat may be the incorporation, advantageously in stacks, of a plurality of cooling channels running one above another in the clearance. In this case, the generator strip advantageously has a plurality of cooling channels, which are arranged in such a manner that at least one of the cooling channels is arranged substantially along the entire stacking height of the conductor stacks.

In order to further minimize the required space—in relation to the achievable strength of the magnetic field—the conductors of the conductor stacks have a rectangular cross section with a short and a long rectangular side and are in contact with the outer shell of a cooling channel on their short side. This rectangular cross section is often formed with rounded or chamfered corner edges, because this both facilitates the insulation of the individual conductors and is also more favorable in manufacturing.

A development of the invention in which the removal of heat from the individual conductors can be improved further is based on this rounded or chamfered formation of the conductor cross section. According to this development, an intermediate space is arranged between the outer side of the cooling channel and in each case two neighboring conductors of one of the conductor stacks, said intermediate space being delimited in particular by the planar outer side of the cooling channel and the conductor bars which lie against one another on their long sides and are rounded or chamfered toward the short side. According to this development, this intermediate space is filled at least partially, particularly advantageously completely, with a filler of high thermal conductivity.

This improves the dissipation of heat even when the cooling channel is arranged on the short side of the rectangular cross section and with simultaneously rounded cross section corners. The fact that, in this case, only approximately for example 60% of the longitudinal extent of the short side comes into direct contact with the outer side of the cooling channel is compensated by the "indirect" transfer of heat by way of the filler which is arranged in the intermediate spaces.

In order to ensure a high thermal conductivity of the filler which is used, the latter comprises a thermosetting resin, for example an epoxy resin, which if appropriate can correspond to the resin used for geometrically fastening the conductors. In the filler under consideration in the present case, planar and/or spherical particles comprising an aluminum oxide material, a boron nitride material and/or another solid material having a thermal conductivity of more than 30 W/mK are admixed to said resin, and are advantageously distributed substantially uniformly in said resin.

The generator strip advantageously has two end sides. In order to make the attachment of the generator strip to a cooling water circuit of the electric machines as simple as possible, the cooling channel can be connected at said end sides in each case by means of a single cooling water interface to the cooling water circuit.

An electric machine according to the invention has a rotor assembly and a stator assembly, and has a plurality of conductor groups each having a plurality of series-connected generator strips in the sense of the invention. Through the use of such generator strips, it is possible to achieve, for example, a simple design of the water circuits of the electric machine.

The electric machine to this end advantageously has a cooling water circuit, which supplies all generator strips of a conductor group with cooling water. A conductor group can be understood to mean in particular the arrangement of all generator strips arranged in a recess of the stator core.

A method according to the invention for producing a water-cooled generator strip refers in particular to generator strips for the purposes of the invention, but also to other generator strips. The method comprises the following steps: coating a cooling channel on an outer side with a filler of high thermal conductivity, providing two conductor stacks, positioning the conductor stacks and the coated cooling channel in relation to one another in such a way that there is contact between the conductor insulations of the individual conductors of the conductor stacks and the filler, and curing the assembly of conductor stacks and cooling channel which is positioned in such a manner by heating and/or applying pressure.

Pre-coating of the cooling channel with the filler does away with the need to use what is termed a "separator", at which, in the case of conventional generators, the resin is introduced between two conductor stacks arranged in parallel, because the cooling channel is so to speak used as said "separator". The conventional manufacturing steps of "mounting the cooling channels" and "mounting the separation of the conductor stacks (resin-filled at separator)" can be combined in this way, and this simplifies the manufacturing considerably.

BRIEF DESCRIPTION OF THE DRAWINGS

The above-described properties, features and advantages of this invention and also the way in which these are achieved will become clearer and more markedly understandable in conjunction with the following description of the exemplary embodiments, which will be explained in more detail in conjunction with the drawings, in which.

DETAILED DESCRIPTION OF INVENTION

Figure 1:
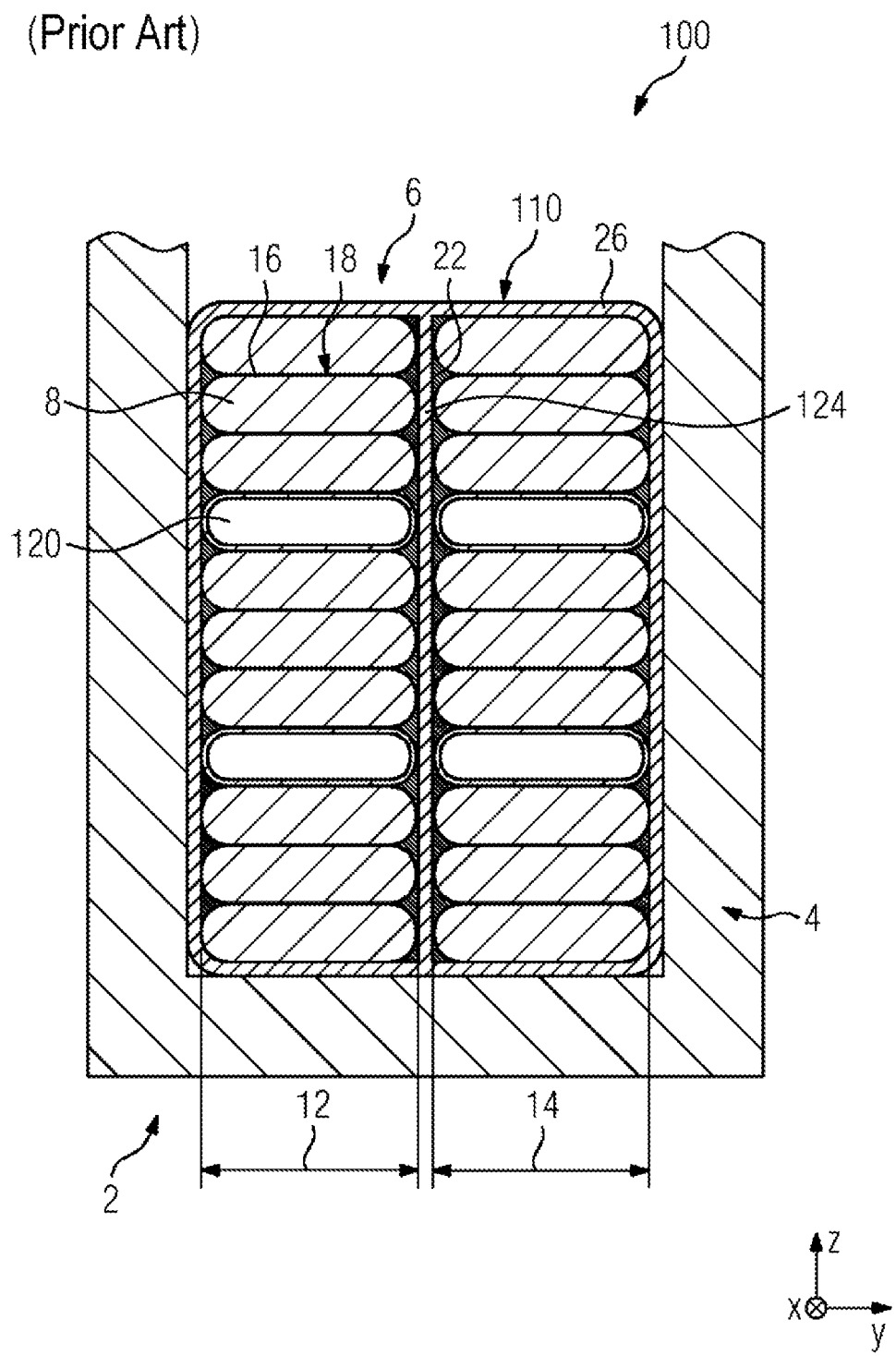
FIG. 1 shows, in a sectional view, a known generator strip having a plurality of cooling channels.

FIG. 1 illustrates the known generator strip 110, presented in the introductory part of the description, in its installation surroundings, a section of a known electric machine 100. This generator strip 110 is complicated to manufacture, and, on account of the arrangement of the cooling channels 120 within the conductor stacks 12 and 14, has a high space demand in the vertical stacking direction Z.

Figure 2:
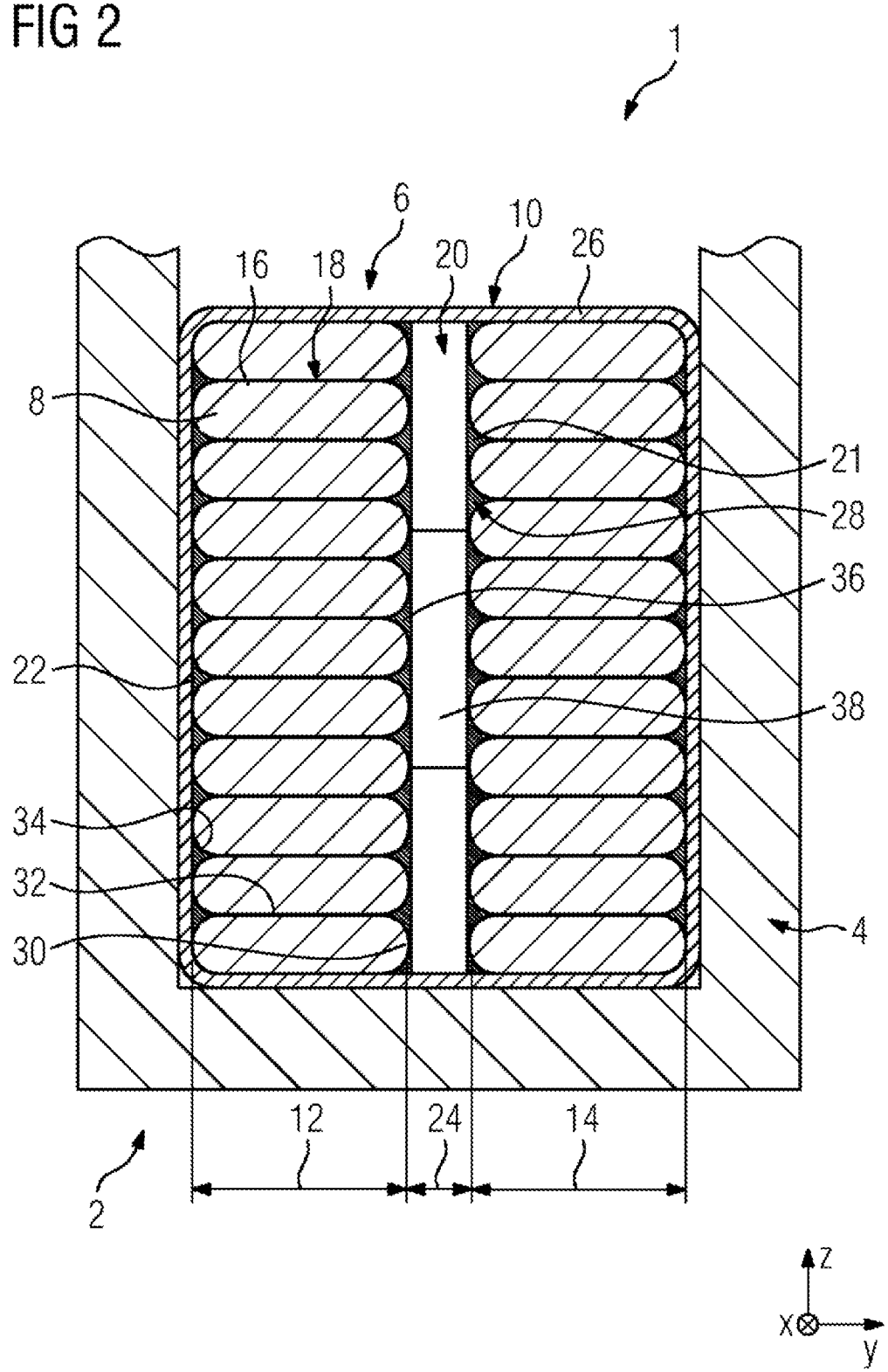
FIG. 2 shows, in a sectional view, a generator strip according to one embodiment of the invention, with a central cooling channel.

FIG. 2 illustrates a section of an electric machine 1, here of a turbogenerator, having a water-cooled generator strip 10 with a single, central cooling channel 20 according to one embodiment of the invention.

The generator strip 10 illustrated has at least two conductor stacks 12 and 14, which are arranged in parallel and the conductors of which, here conductor bars 8, are electrically separated from one another by means of a conductor insulation 16, which is arranged on a circumference 18 of the conductor bar 8 (on each separately). The conductor bars 8 are fastened geometrically in relation to one another by means of a cured resin 22 and by means of a cured filler 28 of high thermal conductivity. A clearance 24 is provided between the conductor stacks 12 and 14, in which clearance there is arranged an individual cooling channel 20 extending—with respect to the vertical stacking direction Z—along the entire extent of the conductor stacks 12 and 14.

An outer side of an outer shell 21 of the cooling channel 20 is in contact with the short side 30, facing toward it, of each of the conductor bars 8, to the extent that this direct contact is not impossible on account of the rounded formation (rounded portions 34) of the otherwise rectangular cross section of the conductor bars 8.

An intermediate space 36 is formed in each case on account of the rounded portions 34 between the cooling channel 20 and in each case two neighboring conductor plates 8, in which intermediate space there is arranged, in this exemplary embodiment, a filler 28 of high thermal conductivity comprising a cured resin and thermally conductive particles arranged distributed therein.

In spite of the rounded portions 34 at the short sides 30 of the conductor bars 8, which have a shorter form compared to the long sides 32, the use of this filler 28 ensures that there is an adequate transport of heat from the conductor bars toward the cooling channel 20 and therefore the cooling water.

In order to ensure a homogeneous flow of cooling water and in particular a homogeneous uptake of heat over the entire stacking height, two separating bands 38, also referred to as bridges, are moreover provided in the cooling channel, and extend in the exemplary embodiment (as is evident from FIG. 3) substantially along the entire longitudinal extent X of the generator strip 10.

During the manufacturing of the generator strip 10 in accordance with this exemplary embodiment, the conventional manufacturing steps of "mounting the cooling channels" and "mounting the separation of the conductor stacks (resin at separator)" can be combined by coating the cooling channel 20, for assembly, with the filler 28, such that the latter can penetrate into the intermediate spaces 36 after assembly with the conductor stacks 12, 14 and before the curing.

Figure 3:
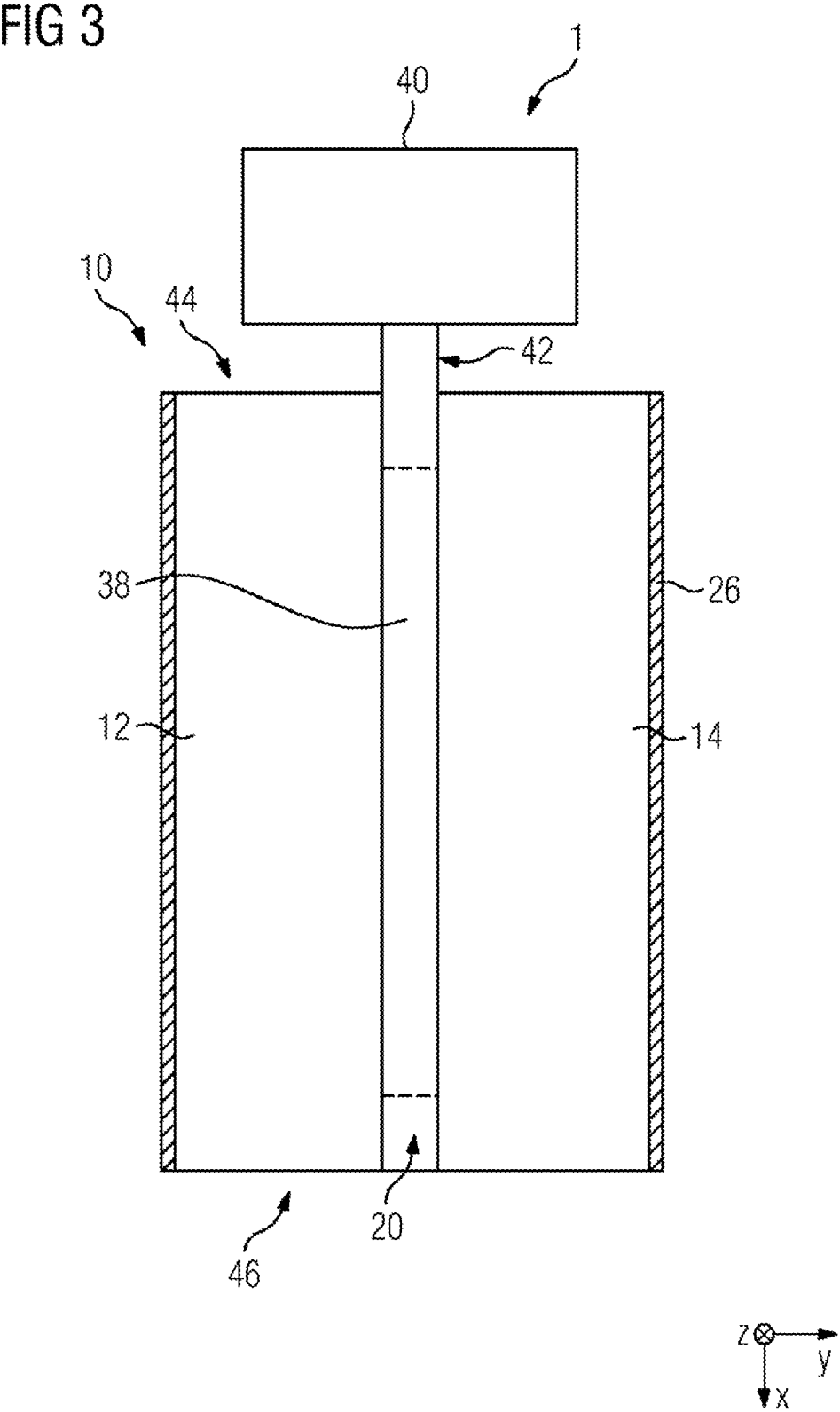
FIG. 3 shows, in a plan view, the generator strip as shown in FIG. 2 with a cooling water connection.

FIG. 3 illustrates, in a plan view, the exemplary embodiment as shown in FIG. 2, it becoming evident that the cooling channel 20 extends along the entire longitudinal extent X of the generator strip 10. Moreover, a single cooling water interface 42 to a schematically illustrated cooling water circuit 40 is illustrated on a first end side 44 of the generator strip 10, it being possible for said cooling water interface to be configured in a significantly simpler manner than the multiple interfaces which are required in the case of cooling channels which are not arranged in a central manner, for example as shown in FIG. 1.

FIG. 3, in particular at a second end side 46, does not illustrate any conductor interface or any cooling channel interface to further generator strips arranged if appropriate in the positive X direction. At least such cooling channel interfaces can likewise be configured in a significantly simpler manner than those in accordance with the prior art, however; by way of example, in a manner analogous to the cooling water interface 42 illustrated in FIG. 3.

The invention claimed is:
1. A water-cooled generator strip comprising:
at least two conductor stacks, which are arranged in parallel and which each comprises a plurality of conductors which are arranged one above another and are electrically insulated from one another by a conductor insulation, wherein the plurality of conductors are fastened geometrically in relation to one another by a cured resin, and
at least one cooling channel for conveying cooling water arranged in a clearance between the at least two conductor stacks, wherein the at least one cooling channel comprises an outer shell comprising a thermally conductive material, an outer side of the outer shell is in direct contact at least in partial portions with the conductor insulation of the plurality of conductors, and the outer shell of the at least one cooling channel at least in certain regions comprises a ferromagnetic material and an electrical insulating layer,
wherein the ferromagnetic material is used in the outer shell in different proportions by weight.
2. The generator strip as claimed in claim 1,
wherein the outer shell of the at least one cooling channel comprises a fiber-reinforced and/or abrasion-resistant polymer material, a polymer material, and/or a non-magnetic metallic material.
3. The generator strip as claimed in claim 1,
wherein the at least one cooling channel extends substantially along an entire stacking height of the at least two conductor stacks.
4. The generator strip as claimed in claim 1, further comprising:

at least one separating band in the at least one cooling channel for directing a flow of cooling water in the at least one cooling channel.

5. The generator strip as claimed in claim 4, wherein the at least one separating band runs transversely to a vertical stacking direction in the at least one cooling channel.

6. The generator strip as claimed in claim 1, wherein the at least one cooling channel comprises a plurality of cooling channels which are arranged in such a manner that the plurality of cooling channels is arranged along an entire stacking height of the at least two conductor stacks.

7. The generator strip as claimed in claim 1, wherein conductors of the plurality of conductors comprise a rounded or chamfered rectangular cross section with a short side and a long side and conductor insulation on the short side is in direct contact with the outer shell of the at least one cooling channel.

8. The generator strip as claimed in claim 1, wherein an intermediate space is filled at least partially with a thermally conductive filler arranged between the outer side of the at least one cooling channel and in each case two neighboring conductors the plurality of conductors.

9. The generator strip as claimed in claim 8, wherein the thermally conductive filler comprises a thermosetting resin, in which there are arranged planar and/or spherical particles comprising an aluminum oxide material, a boron nitride material and/or another solid material comprising a thermal conductivity of more than 30 W/mK.

10. The generator strip as claimed in claim 9, wherein the planar and/or spherical particles are distributed in a uniform manner.

11. The generator strip as claimed in claim 1, further comprising:
two end sides, at which the at least one cooling channel is connected in each case by a respective single cooling water interface to a cooling water circuit, to another cooling channel of the at least one cooling channel of the generator strip, or to a further generator strip.

12. An electric machine comprising:
a rotor assembly and a stator assembly, and
a plurality of conductor groups each comprising a plurality of series-connected generator strips as claimed in claim 1.

13. The electric machine as claimed in claim 12, further comprising:
a cooling water circuit which supplies all or at least some of the plurality of series-connected generator strips of a conductor group of the plurality of conductor groups with the cooling water.

14. A method for producing a water-cooled generator strip, as claimed in claim 1, said method comprising:
coating the at least one cooling channel on an outer side with a thermally conductive filler,
positioning the at least two conductor stacks and the coated at least one cooling channel in relation to one another in such a way that there is contact between conductor insulations of individual conductors of the plurality of conductors and the at least one cooling channel; and
curing an assembly comprising the at least two conductor stacks and the at least one cooling channel which is positioned in such a manner by heating and/or applying pressure.

15. A water-cooled generator strip comprising:
two conductor stacks arranged in parallel, wherein each conductor stack of the two conductor stacks comprises a plurality of conductors arranged one above another, each conductor of the plurality of conductors comprising a conductor insulation that electrically insulates each conductor, wherein the plurality of conductors are fastened geometrically in relation to one another by a cured resin, and
a cooling channel configured to convey cooling water and arranged in a clearance between the two conductor stacks, wherein the cooling channel comprises an outer shell comprising a thermally conductive material, an electrical insulating layer, and a ferromagnetic material, wherein the ferromagnetic material is used in the outer shell in different proportions by weight,
wherein an outer side of the outer shell is in direct contact the conductor insulation of the plurality of conductors.

* * * * *